Aug. 18, 1925.
F. C. JOHNSON
LUGGAGE CARRIER FOR AUTOMOBILES
Filed May 9, 1924 2 Sheets-Sheet 1
1,550,169
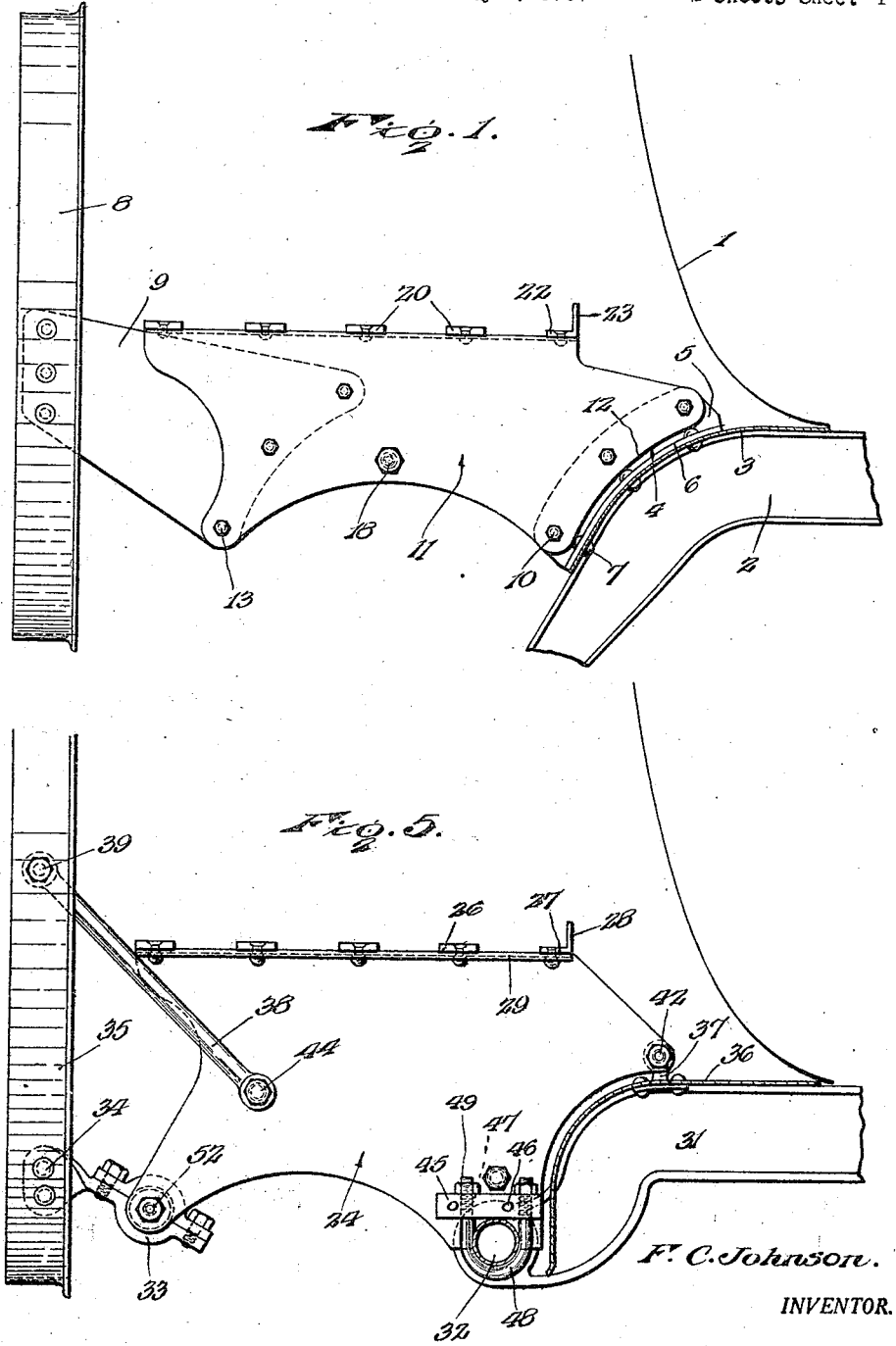

Aug. 18, 1925.
F. C. JOHNSON
LUGGAGE CARRIER FOR AUTOMOBILES
Filed May 9, 1924  2 Sheets-Sheet 2
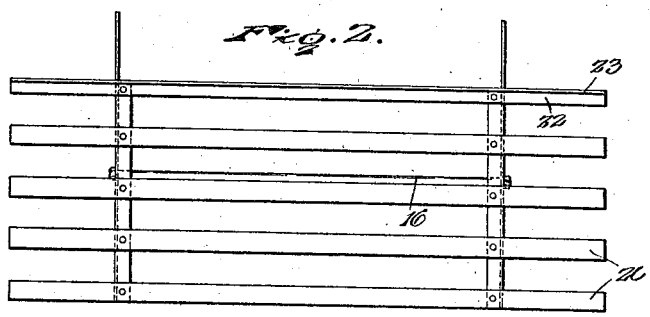
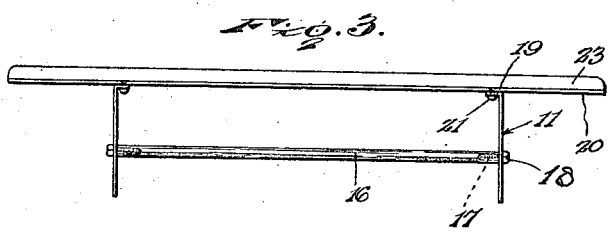 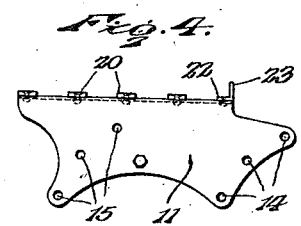
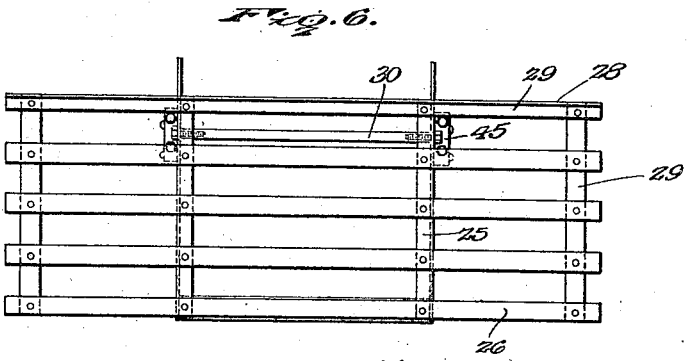
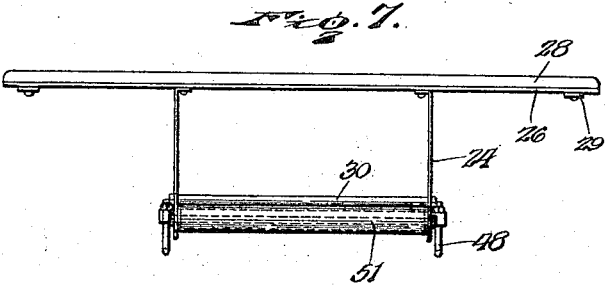 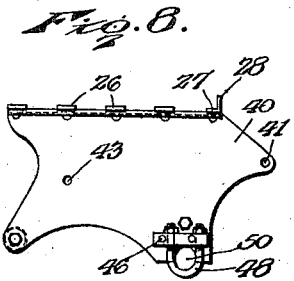
F. C. Johnson.
INVENTOR.
BY *Lacey & Lacey*
ATTORNEYS.

Patented Aug. 18, 1925.

1,550,169

UNITED STATES PATENT OFFICE.

FREDERICK C. JOHNSON, OF FOSTORIA, OHIO, ASSIGNOR TO THE BRADLEY MOTOR PRODUCTS CO., OF FOSTORIA, OHIO.

LUGGAGE CARRIER FOR AUTOMOBILES.

Application filed May 9, 1924. Serial No. 712,088.

*To all whom it may concern:*

Be it known that I, FREDERICK C. JOHNSON, a citizen of the United States, residing at Fostoria, in the county of Seneca and State of Ohio, have invented certain new and useful Improvements in Luggage Carriers for Automobiles, of which the following is a specification.

This invention relates to improvements in trunk and luggage carriers for automobiles and has as one of its objects to provide a device of this class which, while light in weight, will be exceptionally strong and durable and capable of sustaining a considerable weight or load.

The luggage and trunk carrier embodying the invention, in the forms illustrated in the drawings, is intended primarily for employment upon Buick cars although by a slight modification of the structure, the same may be adapted for use upon other makes of cars. The Buick car is provided with a spare tire support having means adapting it to be folded or otherwise fixed at the rear of the chassis frame and body of the car, and the present invention contemplates the provision of a trunk and luggage carrier of such construction as to adapt it to be interposed between the tire carrier and the attaching means for the carrier and to which the carrier is ordinarily connected, so that the trunk or other luggage supported upon the carrier may be located in a place upon the car where it will not interfere with the customary use of the running board and side doors and where it will in fact improve the appearance of the car.

In the accompanying drawings:

Figure 1 is a view in side elevation of one form of luggage carrier embodying the present invention;

Figure 2 is a top plan view of the carrier separated from the automobile;

Figure 3 is a side elevation of the carrier;

Figure 4 is an end elevation thereof;

Figure 5 is a view similar to Figure 1, parts being shown in section illustrating another embodiment of the invention;

Figure 6 is a view similar to Figure 2 illustrating the carrier shown in Figure 5;

Figure 7 is a side elevation of the carrier shown in Figure 6;

Figure 8 is an end elevation of said carrier.

In the drawings, and referring more particularly to Figures 1 to 4, inclusive, the rear end of the body of the automobile is indicated by the numeral 1 and the side members of the chassis frame by the numeral 2. The numeral 3 indicates a plate which is suitably formed and is riveted or otherwise secured to the side members 2 of the chassis frame and extends between the said members in rear of the body 1, the rear portion of the plate being deflected downwardly and the plate being given a more or less downward and rearward curve as clearly shown in Figure 1. On one type of Buick car there are provided attaching bracket members such as shown in Figure 1 and indicated by the numeral 4 and each of these members comprises an arcuate plate 5 having a flange 6 riveted as at 7 to the said plate 3. The spare tire carrier is indicated by the numeral 8 and is of the type ordinarily employed, and in this particular type of car the annular carrier frame is provided at opposite sides with bracket plates indicated by the numeral 9. These plates are secured to the inner side of the annular carrier frame and extend forwardly therefrom and are provided with an arcuate series of bolt openings through which and a similarly arranged and spaced series of openings in the plate 5, are secured bolts 10 for the purpose of mounting the tire carrier upon the rear of the automobile. As heretofore indicated, the purpose of the present invention is to provide a trunk and luggage carrier which may be interposed between the attaching members 4 and the respective bracket plates 9 of the tire carrying frame 8, and as illustrated in the said Figures 1 to 4, inclusive, the carrier comprises a pair of side plates which are indicated in general by the numeral 11 and which may be made of sheet metal of a suitable gage and may have the general contour shown in Figures 1 and 4. The said plates 11 are provided with arcuate forward edges 12 and through the forward edge portions of the plates are formed openings through which the bolts 10 may be passed, as well as through the openings in the attaching plates 5, for the purpose of securing the forward ends of the side plates 11 to the attaching members 4 and thus rigidly support the plates in upright parallel relationship.

Near its forward end, each of the plates 11 is provided with an arcuate series of openings located on the same arc and spaced to correspond to the spacing of the openings in the attaching plates 5 and in the bracket plates 9, and bolts 13 are secured through the openings in the said plates 11 and the openings in the said bracket plates 9. In this manner the tire carrier is supported by and between the plates 11 which plates 11 have, at the time of installation of the device, taken the place of the bracket plates 9.

Each of the side plates 11 is formed, between the first and last mentioned series of openings in the said plates, which first and last mentioned series are indicated respectively by the numerals 14 and 15, with an opening, and a bracing rod 16 is positioned between the said plates 11 and extends between the same with its ends abutting the opposing or inner faces of the plates, and the said ends of the rod are formed with threaded sockets 17 into which and through the last mentioned openings, are threaded stud bolts indicated by the numeral 18, the said bolts serving to securely anchor the ends of the rod 16 to the said plates, and the rod in its turn serving to relatively brace the plates and maintain them in parallelism as well as render the structure more rigid.

Each plate 11 is formed at its upper edge with an inwardly projecting horizontal flange 19, and disposed upon the upper sides of the said flanges of the two plates and extending in parallelism and longitudinally between and, at their ends, beyond the said flanged upper edges of the side plates 11, are slats 20 secured to the said flanges by rivets or other suitable securing means indicated by the numeral 21, the upper ends of the securing elements being preferably flush with the upper surfaces of the slats so as to prevent marring of any piece of luggage which may be disposed upon the carrier. In addition to the slats 20, there is employed, at the forward side of the carrier, a slat 22 which is preferably of angle iron and therefore embodies an upstanding flange 23 which constitutes a stop against which a trunk or other piece of luggage, disposed upon the carrier, may rest, thus spacing the piece of luggage from the back of the body of the automobile and preventing rubbing contact which would mar the finish of the automobile.

In the form of the invention shown in Figures 5, 6, 7 and 8 of the drawings, the carrier embodies side plates 24 having inturned flanges 25 at their upper edges and supporting slats 26 which are riveted or otherwise secured to the said flanges at their points of intersection therewith. This embodiment also includes a slat 27 which corresponds to the slats 22 and which is provided with an upstanding flange 28 serving the same purpose as the flange 23 in the previously described embodiment of the invention. As illustrated in Figures 6 and 7 of the drawings, the slats 26 and 27 may be further braced and held in parallel relation to each other by brace bars 29 secured to the under sides of the said slats at their ends which project beyond the side plates 24. A brace 30 corresponding in every respect to the brace 16 in the previously described form of the invention, is provided between the side plates 24, and it will be evident that so far as the present embodiment has been described, its structure is substantially identical with the embodiment previously described. However, the modified structure is designed for installation upon a different model of Buick automobile, and, therefore, with regard to the means provided for securing the attachment in place, there are structural differences between these two constructions. In the particular model of automobile referred to, the chassis side bars, shown in Figure 5 and indicated by the numeral 31, have their rear ends extended downwardly and thence rearwardly a relatively short distance, and a tubular brace member 32 is, in practice, mounted at its ends in the lower rear ends of the said chassis frame bars and is adapted to be embraced by two-part clamp members 33 the fixed part of each of which members is secured, as at 34, to the spare tire carrier frame 35, as is customary in this model of the Buick automobile. Likewise there is mounted, on a plate 36 in turn supported by the rear end portions of the chassis frame bars 31, a pair of spaced brackets 37 which upstand from the plates and to which are connected brace rods 38 which in turn are connected, as at 39, to the said spare tire carrier frame 35. In order that the side plates 24 of the modified carrier may be adapted for installation upon this type of car, each plate is provided with a forward extension 40 having an opening 41 therein, and bolts 42 are secured through the said openings 41 and through the openings of the brackets 37. Likewise each side plate is formed with an opening 43, and bolts 44 are secured through these openings and through the forward ends of the brace rods 38. Lugs 45 are integrally united to the side plates 24 or secured thereto by rivets or other suitable fastening elements 46 and are provided with spaced vertically extending openings 47 through which are fitted the threaded ends of U-bolts 48, the said bolts at their bights embracing the tubular brace member 32, and nuts 49 being applied to the upper ends of the said bolts and being tightened to firmly clamp the side plates to the said brace member, the said side plates in their lower sides being formed with recesses substantially semi-circular in form and indicated by the numeral 50, so as to embrace and accommodate the upper sides of the said brace member 32. The numeral 51 indicates a tubular brace member which is exteriorly of the same diameter as the brace member 32 and which is secured at its ends by means of bolts or the like indicated by the numeral 52, to the lower rear corners of the plates 24, the said member extending between the plates as clearly shown in Figure 7 of the drawings. The clamps 33 are adapted to this brace member 51, and in this manner and by reason of the connection previously described, the carrier is supported upon the rear of the chassis frame in the position previously or ordinarily occupied by the spare tire carrier and the spare tire carrier is in turn supported upon the rear of the carrier embodying the invention, as in the previously described form of the invention.

From the foregoing it will be evident that there is provided means for supporting a trunk or other luggage upon an automobile in such location that it will at no time interfere with the customary use of the running board and side doors, and will, on the other hand, improve the appearance of the automobile by somewhat increasing its length and positioning the spare tire carrier a greater distance in rear of the body of the automobile than is customary. It will likewise be evident that by an ingenious and novel arrangement of elements, the carrier embodying the invention is adapted to be quickly and readily installed without in any way altering the construction of the chassis frame, the spare tire carrier attaching or supporting means thereon, or the tire carrier itself, the luggage carrier of the present invention being adapted to be substituted in place of the spare tire carrier and the spare tire carrier being in turn adapted for ready connection with the luggage carrier to be supported thereby.

The invention is, of course, not limited to the precise construction illustrated in the drawings, for the principles of the invention may be embodied in other forms closely resembling those illustrated in the drawings, and adapting the carrier for application to other makes of automobiles and the various models of each make.

Having thus described the invention, what is claimed as new is:

1. The combination with a spare tire carrier and vehicle attached means for supporting the same and to which the carrier is removably attached, of a luggage carrier constructed for interposition between the tire carrier supporting means and the said tire carrier, after detachment of the latter, and likewise constructed to support the said tire carrier by the same means as that by which the tire carrier was initially attached to said supporting means.

2. A luggage carrier comprising side plates having correspondingly spaced and correspondingly arranged openings at front and rear for the passage of securing elements whereby the front of the carrier may be secured to the tire carrier attaching brackets of a motor vehicle and whereby the tire carrier may be supported by the said luggage carrier, and supporting members extending between the said side plates and secured thereto for supporting the luggage.

3. A luggage carrier comprising side plates having correspondingly spaced and correspondingly arranged openings at front and rear for the passage of securing elements whereby the front of the carrier may be secured to the tire carrier attaching brackets of a motor vehicle and whereby the tire carrier may be supported by the said luggage carrier, supporting members extending between the said side plates and secured thereto for supporting the luggage, and a brace extending between the said side plates beneath the said supporting members.

4. A luggage carrier comprising spaced side plates, slats extending between the plates, the upper edges of the plates being provided with flanges, means securing the said slats to the flanges, one of the slats having an upstanding abutment flange whereby to constitute an abutment for luggage disposed upon the said slats, and means relatively bracing the said plates, the plates being constructed for attachment to a fixed support.

5. A tire carrier comprising spaced side plates, supporting members extending between the said plates for supporting luggage, means relatively bracing the said plates, clamping means carried by the plates to coact with the spare tire supporting cross member of a vehicle, and means extending between the said plates and constituting a substitute for the said spare tire supporting cross member and engageable by clamping means upon a tire carrier.

In testimony whereof I affix my signature.

FREDERICK C. JOHNSON.